US012720629B2

(12) United States Patent
Zheng et al.

(10) Patent No.: US 12,720,629 B2
(45) Date of Patent: Aug. 25, 2026

(54) METHOD, APPARATUS AND COMMUNICATION DEVICE FOR CONTROLLING RRC CONNECTION

(71) Applicant: VIVO MOBILE COMMUNICATION CO., LTD., Chang'an Dongguan (CN)

(72) Inventors: Qian Zheng, Chang'an Dongguan (CN); Xiaodong Yang, Chang'an Dongguan (CN); Jiamin Liu, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 323 days.

(21) Appl. No.: 18/460,666

(22) Filed: Sep. 4, 2023

(65) Prior Publication Data

US 2023/0422334 A1 Dec. 28, 2023

Related U.S. Application Data

(63) Continuation of application No. PCT/CN2022/078557, filed on Mar. 1, 2022.

(30) Foreign Application Priority Data

Mar. 5, 2021 (CN) ........................ 202110247325.X

(51) Int. Cl.

*H04W 76/19* (2018.01)
*H04W 8/00* (2009.01)
*H04W 76/20* (2018.01)

(52) U.S. Cl.

CPC ........... *H04W 76/19* (2018.02); *H04W 8/005* (2013.01); *H04W 76/20* (2018.02)

(58) Field of Classification Search

CPC ..... H04W 76/19; H04W 8/005; H04W 76/20; H04W 76/27; H04W 88/04; H04W 76/14;

(Continued)

(56) References Cited

U.S. PATENT DOCUMENTS

2021/0051758 A1* 2/2021 Xu ........................ H04W 76/18
2022/0007445 A1* 1/2022 Pan ....................... H04W 76/15

FOREIGN PATENT DOCUMENTS

CN 102223658 A 10/2011
CN 112399642 A 2/2021
JP 2018-026625 A 2/2018

OTHER PUBLICATIONS

ZTE Corporation, "Discussion on Remaining Issues on L2 Relay," 3GPP TSG RAN WG2 Meeting #112, electronic Online RS-2009030, 6 pages, Oct. 23, 2020.

(Continued)

*Primary Examiner* — Shawn D Miller
(74) *Attorney, Agent, or Firm* — Foley & Lardner LLP

(57) ABSTRACT

The present application discloses a method, apparatus and communication device for controlling an RRC connection, and falls within the technical field of communications. The method of the present application includes: performing, by a relay user equipment, a first behavior in a case that the first condition is satisfied, the first behavior including at least one of the following: triggering, through a first interface, an RRC re-establishment procedure or an RRC connection establishment procedure; transmitting, through a second interface to the remote user equipment, abnormal connection indication information or stopping broadcasting a discovery signal; where the first condition includes a first interface link connection failure, a first interface link connection recovery failure or an abnormal entry into an RRC idle state; where the first interface is a connection interface between the relay user equipment and a network-side device.

16 Claims, 3 Drawing Sheets

(58) Field of Classification Search
CPC ..... H04W 76/18; H04W 92/18; H04W 92/10; H04W 40/22
See application file for complete search history.

(56) References Cited

OTHER PUBLICATIONS

ZTE Corporaton, "Discussion on Remaining Issues on L2 UE-to-Network Relay," 3GPP TSG RAN WG2 Meeting #113, electronic Online, R2-2100300, 5 pages, Jan. 15, 2021.
JP Office Action on JP Appl. No. 2025-081131 dated Jun. 30, 2026 (8 pages).

* cited by examiner

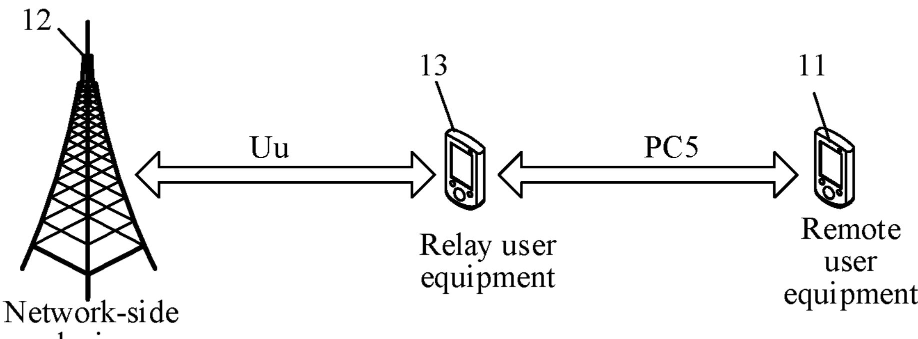

FIG. 1

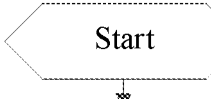

Perform, by a relay user equipment, a first behavior in a case that the first condition is satisfied, the first behavior comprising at least one of:

triggering, through a first interface, a radio resource control (RRC) re-establishment procedure or an RRC connection establishment procedure; and transmitting, through a second interface to a remote user equipment, abnormal connection indication information or stopping broadcasting a discovery signal.

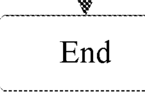

FIG. 2

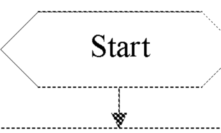

Determine a second behavior executed by a remote user equipment according to the first behavior of the relay user equipment; the first behavior includes at least one of: triggering, through a first interface, a radio resource control (RRC) re-establishment procedure or an RRC connection establishment procedure; and transmitting, through a second interface to a remote user equipment, abnormal connection indication information or stopping broadcasting a discovery signal.

301

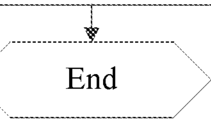

FIG. 3

METHOD, APPARATUS AND COMMUNICATION DEVICE FOR CONTROLLING RRC CONNECTION

CROSS-REFERENCE TO RELATED APPLICATIONS

This application is a continuation application of International Application No. PCT/CN2022/078557 filed on Mar. 1, 2022, which claims priority to Chinese Patent Application No. 202110247325. X, filed in China on Mar. 5, 2021, which is incorporated herein by reference in its entirety.

TECHNICAL FIELD

The present disclosure relates to the field of communications, and in particular to a method, apparatus and communication device for controlling an RRC connection.

BACKGROUND

In a scenario where a remote user equipment (Remote UE) establishes a radio resource control (RRC) connection with a base station via a relay user equipment (relay UE), the RRC connection of the Remote UE is affected by two sections of a PC5 interface connection link and a Uu interface connection link, and when the RRC connection of the Remote UE has a connection failure in any of the above-mentioned two sections of links, the RRC connection of the Remote UE is difficult to recover quickly.

SUMMARY

The embodiments of the present application provide a method, apparatus and communication device for controlling an RRC connection.

In a first aspect, provided is a method for controlling an RRC connection, including:

performing, by a relay user equipment, a first behavior in a case that the first condition is satisfied, the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first condition includes a first interface link connection failure, a first interface link connection recovery failure or an abnormal entry into an RRC idle state;

where the first interface is a connection interface between the relay user equipment and a network-side device;

the second interface is a connection interface between the relay user equipment and the remote user equipment.

In a second aspect, provided is a method for controlling an RRC connection, including:

determining a second behavior executed by the remote user equipment according to a first behavior of the relay user equipment;

the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first interface is a connection interface between the relay user equipment and a network-side device;

the second interface is a connection interface between the relay user equipment and the remote user equipment.

In a third aspect, provided is a method for controlling an RRC connection, including:

performing, by the remote user equipment, one of the following operations in a case that the second condition is satisfied:

triggering, through a direct connection link, an RRC re-establishment procedure or an RRC connection recovery procedure or an RRC connection establishment procedure; and entering an RRC idle state;

where the second condition includes: the second interface link fails, or the measurement result of the discovery signal is lower than a pre-set threshold;

the second interface is a connection interface between the relay user equipment and the remote user equipment.

In a fourth aspect, provided is an apparatus for controlling an RRC connection, including:

a first processing module configured to perform a first behavior in a case that a first condition is satisfied, the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first condition includes a first interface link connection failure, a first interface link connection recovery failure or an abnormal entry into an RRC idle state;

where the first interface is a connection interface between the relay user equipment and a network-side device;

the second interface is a connection interface between the relay user equipment and the remote user equipment.

In a fifth aspect, provided is an apparatus for controlling an RRC connection, including:

a first determination module configured to determine a second behavior executed by the remote user equipment according to the first behavior of the relay user equipment;

the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first interface is a connection interface between the relay user equipment and a network-side device;

the second interface is a connection interface between the relay user equipment and the remote user equipment.

In a sixth aspect, provided is an apparatus for controlling an RRC connection, including:

a fourth processing module configured to perform one of the following operations in a case that the second condition is satisfied:

triggering, through a direct connection link, an RRC re-establishment procedure or an RRC connection recovery procedure or an RRC connection establishment procedure; and entering an RRC idle state;

where the second condition includes: the second interface link fails, or the measurement result of the discovery signal is lower than a pre-set threshold;

the second interface is a connection interface between the relay user equipment and the remote user equipment.

In a seventh aspect, provided is a communication device including a processor, a memory, and a program or instructions stored on the memory and executable on the processor, which, when executed by the processor performs the steps of the method according to the first aspect, or performs the steps of the method according to the second aspect, or performs the steps of the method according to the third aspect.

In an eighth aspect, provided is a readable storage medium having stored thereon a program or instructions, which when executed by a processor, performs the steps of the method according to the first aspect or performs the steps of the method according to the second aspect, or performs the steps of the method according to the third aspect.

In a ninth aspect, provided is a chip including a processor and a communication interface coupled to the processor for running a program or instructions for carrying out the steps of the method according to the first aspect or carrying out the steps of the method according to the second aspect, or for carrying out the steps of the method according to the third aspect.

In a tenth aspect, provided is a computer program product, where the computer program product is stored in a non-transitory storage medium, the computer program product is executed by at least one processor to perform the steps of the method according to the first aspect, or to perform the steps of the method according to the second aspect, or to perform the steps of the method according to the third aspect.

In an eleventh aspect, provided is a communication device configured to perform the steps of the method according to the first aspect, or the steps of the method according to the second aspect, or the steps of the method according to the third aspect.

According to an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, so that the remote user equipment can quickly recover the connection when any segment of a PC5 interface connection link and a Uu interface connection link fails, ensuring the reliability of the relay communication.

BRIEF DESCRIPTION OF THE DRAWINGS

FIG. 1 shows a block diagram of a communication system to which embodiments of the present application may be applied;

FIG. 2 shows one of the schematic flow of the method for controlling an RRC connection according to an embodiment of the present application;

FIG. 3 shows the second schematic flow of a method for controlling an RRC connection according to an embodiment of the present application;

DETAILED DESCRIPTION

Figures 4, 5, 6, 7:
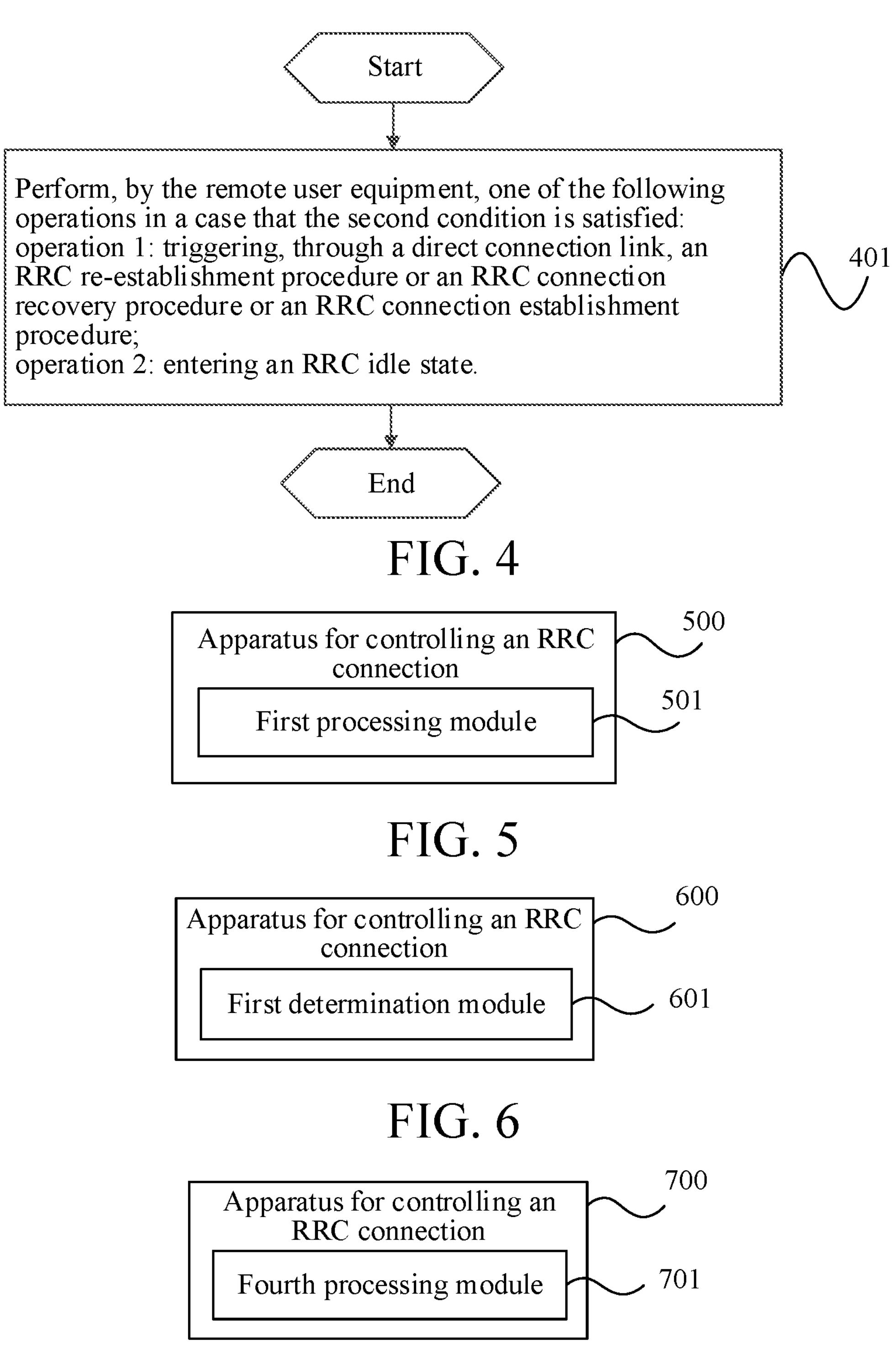
FIG. 4 shows the third schematic flow of a method for controlling an RRC connection according to an embodiment of the present application.
FIG. 5 shows one of the block schematics of an apparatus for controlling an RRC connection according to an embodiment of the present application.
FIG. 6 shows the second block diagram of an apparatus for controlling an RRC connection according to an embodiment of the present application.
FIG. 7 shows the third of the block schematics of an apparatus for controlling an RRC connection according to an embodiment of the present application.

The technical solutions according to an embodiment of the present application will be described below clearly with reference to the drawings according to an embodiment of the present application, and it is obvious that the described embodiments are some, but not all, embodiments of the present application. All other embodiments obtained by a person skilled in the art based on the embodiments in the present application are within the scope of protection of the present application.

The terms "first", "second" and the like in the description and in the claims of the present application are used for distinguishing between similar elements and not necessarily for describing a particular sequential or chronological order. It should be understood that the data so used may be interchanged under appropriate circumstances such that embodiments of the application may be implemented in sequences other than those illustrated or described herein, and the objects distinguished by "first" and "second" are usually a single type, and the number of the objects is not limited, and for example, the first object may be one or more. Further, in the description and the claims "and/or" means at least one of the connected objects, and the character "/" generally means that the associated object is an "or" relationship.

It is noted that the techniques described by embodiments of the present application are not limited to long term evolution (LTE)/LTE-advanced (LTE-A) systems, but may also be used for other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" according to an embodiment of the present application are often used interchangeably, and the techniques described may be used for both the above-mentioned systems and radio technologies, as well as for other systems and radio technologies. However, it is described as follows a new radio (NR) system for purposes of example and uses NR term in much of the description below, but the techniques may also be applied to applications other than NR system applications, such as 6th Generation (6G) communication systems.

To enable a person skilled in the art to better understand the embodiments of the present disclosure, a Sidelink (Sidelink) Relay (Relay) is first described as follows.

A relay technology in a wireless communication system is to add one or more relay nodes between a base station and a terminal, which are responsible for forwarding a wireless signal one or more times, i.e., the wireless signal passes through multiple hops before reaching the terminal.

A wireless relay technology can not only extend cell coverage, make up for cell coverage blind spots, but also improve cell capacity through space resource reuse. For indoor coverage, the relay technology can also be used to overcome penetration loss and improve the quality of indoor coverage.

Taking a simple two-hop relay as an example, a wireless relay divides a base station-to-terminal link into two links, namely, a base station-to-relay station link and a relay station-to-terminal link, so that there is an opportunity to replace a link with poor quality with two links with better quality to obtain higher link capacity and better coverage.

As shown in FIG. 1, the relay user equipment 13 has one end connected to a remote user equipment 11 and the other end connected to a network-side device 12. The remote user equipment 11 may also be referred to as a terminal device or a user equipment (UE), and the remote user equipment may be a terminal side device such as a mobile phone, a tablet computer, a laptop computer or a notebook computer, a personal digital assistant (PDA), a palmtop computer, an ultra-mobile personal computer (UMPC), a mobile Internet device (MID), a wearable device or a vehicle user equipment (VUE), a pedestrian user equipment (PUE), and the wearable device includes: bracelets, earphones, glasses, etc. It should be noted that a specific type of the remote user equipment is not limited in the embodiments of the present application. The network-side device 12 may be a base station or a core network device, and the base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, and a home evolved Node B, a wireless local area networks (Wireless Local Area Networks, WLAN) access point, a wireless fidelity (WiFi) node, a transmitting receiving point (TRP) or some other suitable term in the art, and as long as the same technical effect is achieved, the base station is not limited to a specific technical term, and it needs to be noted that according to an embodiment of the present application, only a base station in an NR system is taken as an example, but the specific type of the base station is not limited.

The method for controlling an RRC connection according to an embodiment of the present application will be described in detail through specific embodiments and application scenarios thereof with reference to the accompanying drawings.

As shown in FIG. 2, the method for controlling an RRC connection according to an embodiment of the present application includes:

step 201: performing, by a relay user equipment, a first behavior in a case that the first condition is satisfied, the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first condition includes a first interface link connection failure, a first interface link connection recovery failure or an abnormal entry into an RRC idle state;

where the first interface is a connection interface between the relay user equipment and a network-side device;

the second interface is a connection interface between the relay user equipment and the remote user equipment.

Alternatively, according to an embodiment of the present application, the above-mentioned first interface is a cellular network communication interface (Uu interface), and the above-mentioned second interface is a direct connection communication interface (PC5 interface).

Here, the condition for an abnormal entry into an RRC idle state is an existing condition, for example, a non-access stratum network attached storage (NAS) security problem occurs, which is not described in detail herein.

According to the method for controlling an RRC connection in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, so that the remote user equipment can quickly recover the connection when any segment of a PC5 interface connection link and a Uu interface connection link fails, ensuring the reliability of the relay communication.

As a first alternative implementation, where the first behavior includes triggering, through a first interface, a radio resource control (RRC) re-establishment procedure or an RRC connection establishment procedure, then the method further includes:

receiving, by the relay user equipment, an RRC reconfiguration message or an RRC connection recovery message of the remote user equipment transmitted by a network-side device after the RRC re-establishment succeeds or the RRC connection establishment succeeds;

where the RRC reconfiguration message includes an incremental configuration or a full configuration;

the RRC connection recovery message includes an incremental configuration or a full configuration.

Specifically, when the remote user equipment is in an RRC connected state, the relay user equipment receives the RRC reconfiguration message transmitted by the network-side device, and when the remote user equipment is in an RRC inactive state, the relay user equipment receives the RRC connection recovery message transmitted by the network-side device.

In the implementation, an initial RRC state of the relay user equipment is: a connected state, the initial RRC state of the remote user equipment being: a connected or inactivated state.

Alternatively, the method of the embodiments of the present application further includes:

forwarding, by the relay user equipment, the RRC reconfiguration message or the RRC connection recovery message to the remote user equipment.

Alternatively, the method of the embodiments of the present application further includes:

the relay user equipment forwards the RRC reconfiguration complete message or the RRC connection recovery complete message transmitted by the remote user equipment to the network-side device;

Specifically, when transmitting the RRC reconfiguration message to the remote user equipment, the remote user equipment transmits an RRC reconfiguration complete message to the relay user equipment, and when transmitting the RRC connection recovery message to the remote user equipment, the remote user equipment transmits an RRC connection recovery complete message to the relay user equipment.

As a second alternative implementation, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, the method further including:

assisting, by the relay user equipment, the remote user equipment to trigger an RRC re-establishment procedure or an RRC connection establishment procedure or an RRC connection recovery procedure after a successful RRC re-establishment or a successful RRC connection establishment.

In the implementation, an initial RRC state of the relay user equipment is: a connected state, the initial RRC state of the remote user equipment being: a connected or inactivated state.

According to the method for controlling an RRC connection in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, so that the remote user equipment can quickly recover the connection when any segment of a PC5 interface connection link and a Uu interface connection link fails, ensuring the reliability of the relay communication.

As shown in FIG. 3, an embodiment of the present application also provides a method for controlling an RRC connection, including:

step 301: determining a second behavior executed by the remote user equipment according to a first behavior of the relay user equipment;

the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first interface is a connection interface between the relay user equipment and a network-side device;

the second interface is a connection interface between the relay user equipment and the remote user equipment.

Alternatively, according to an embodiment of the present application, the above-mentioned first interface is a Uu interface, and the above-mentioned second interface is a PC5 interface.

The above-mentioned first behavior is a behavior executed by a relay user equipment in a case that a first condition is satisfied, where the first condition includes a first interface link connection failure, a first interface link connection recovery failure or an abnormal entry into an RRC idle state.

According to the method for controlling an RRC connection in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, the remote user equipment executes a corresponding second behavior according to the first behavior of the relay user equipment, so that the remote user equipment can quickly recover the connection when any segment of a PC5 interface connection link and a Uu interface connection link fails, ensuring the reliability of the relay communication.

As a first alternative implementation, in a case that the first behavior includes triggering, through a first interface, a radio resource control (RRC) re-establishment procedure or an RRC connection establishment procedure, then the second behavior includes:

acquiring an RRC reconfiguration message or an RRC connection recovery message forwarded by the relay user equipment;

where the RRC reconfiguration message includes an incremental configuration or a full configuration;

the RRC connection recovery message includes an incremental configuration or a full configuration.

Specifically, when the remote user equipment is in an RRC connected state, an RRC reconfiguration message forwarded by the relay user equipment is acquired, and when the remote user equipment is in an RRC inactive state, an RRC connection recovery message forwarded by the relay user equipment is acquired.

In the implementation, an initial RRC state of the relay user equipment is: a connected state; an initial RRC state of the remote user equipment is: a connected or inactivated state.

Alternatively, the method of the embodiments of the present application further includes:

transmitting an RRC reconfiguration complete message or an RRC connection recovery complete message to the relay user equipment.

As a second alternative implementation, in a case that the first behavior includes transmitting, through a second interface to a remote user equipment, abnormal connection indication information or stopping broadcasting a discovery signal, then the second behavior includes at least one of the following:

triggering a relay re-selection procedure according to abnormal connection indication information;

triggering a relay re-selection procedure according to a measurement of the discovery signal; and entering an RRC idle state.

Alternatively, the method of the embodiments of the present application further includes:

triggering, through a reselected relay user equipment, an RRC connection establishment procedure or an RRC re-establishment procedure or an RRC connection recovery procedure after the remote user equipment triggers the relay re-selection procedure.

In the implementation, an initial RRC state of the relay user equipment is: a connected state; an initial RRC state of the remote user equipment is: a connected or inactivated state.

As a third alternative implementation, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, the second behavior further includes:

triggering, through the relay user equipment, an RRC connection establishment procedure or an RRC re-establishment procedure or an RRC connection recovery procedure after the relay user equipment RRC re-establishment succeeds or RRC connection establishment succeeds.

In the implementation, an initial RRC state of the relay user equipment is: a connected state, the initial RRC state of the remote user equipment being: a connected or inactivated state.

The present application is described in detail below with reference to embodiments.

Embodiment I: When Both Remote UE and Relay UE are in an RRC Connected (RRC Connected) State When the Relay UE determines that Uu link failure (i.e., a first interface link connection failure) occurs, at least one of operations is performed:

Operation 1: the Relay UE transmits an abnormal connection indication to the Remote UE or the Relay UE stops transmitting Discovery (Discovery) signals via a PC5 interface.

1) If the indication information is transmitted, when the Remote UE receives the indication information:

the Remote UE triggers an RRC re-establishment procedure; or, the Remote UE triggers the relay re-selection procedure; or, the Remote UE releases the Uu RRC linkage into an RRC Idle state.

2) If the transmitting the Discovery signal is stopped, then the relay re-selection procedure is triggered when the Remote UE measurement finds that the Relay UE does not satisfy a suitable relay (suitable relay) condition.

Operation 2: The relay UE triggers the RRC re-establishment procedure via a Uu interface.

After the Relay UE re-establishment succeeds, a base station performs an incremental configuration (delta config) operation on the Remote UE via the Relay UE, i.e., the Remote UE does not need to trigger the RRC re-establishment, and only passively receives the RRC reconfiguration message from the base station transferred by the Relay UE.

Embodiment II: When Both the Remote UE and the Relay UE are in an RRC Connected State When the Relay UE determines that Uu link recovery failure (i.e., a first interface link connection recovery failure) occurs or an RRC Idle state is abnormally entered, at least one of operations is performed:

Operation 1: the Relay UE transmits one abnormal connection indication to the Remote UE or the Relay UE stops transmitting a Discovery signal via a PC5 interface.

1) If the indication information is transmitted, when the Remote UE receives the indication information:

the Remote UE triggers the RRC connection establishment procedure; or, the Remote UE triggers the relay re-selection procedure; or, the Remote UE releases the Uu RRC linkage into an RRC Idle state.

2) If the transmitting the Discovery signal is stopped, then the relay re-selection procedure is triggered when the Remote UE measurement finds that the Relay UE does not satisfy a suitable relay condition.

Operation 2: the relay UE triggers the RRC connection establishment procedure via a Uu interface.

After the Relay UE connection establishment succeeds, a base station performs a full configuration (full config) operation on the Remote UE via the Relay UE, i.e., the Remote UE does not need to trigger the RRC connection establishment, and only passively receives an RRC reconfiguration message transferred by the Relay UE and coming from the base station.

According to the method for controlling an RRC connection in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, the remote user equipment executes a corresponding second behavior according to the first behavior of the relay user equipment, so that the remote user equipment can quickly recover the connection when any segment of a PC5 interface connection link and a Uu interface connection link fails, ensuring the reliability of the relay communication.

As shown in FIG. 4, an embodiment of the present application also provides a method for controlling an RRC connection, including:

step 401: performing, by the remote user equipment, one of the following operations in a case that the second condition is satisfied:

Operation 1: triggering, through a direct connection link, an RRC re-establishment procedure or an RRC connection recovery procedure or an RRC connection establishment procedure;

Operation 2: entering an RRC idle state;

where the second condition includes: the second interface link fails, or the measurement result of the discovery signal is lower than a pre-set threshold;

the second interface is a connection interface between the relay user equipment and the remote user equipment.

Alternatively, according to an embodiment of the present application, the above-mentioned first interface is a Uu interface, and the above-mentioned second interface is a PC5 interface.

According to an embodiment of the present application, when the remote user equipment determines that a PC5 link connection fails or finds that the signal measurement result is lower than a pre-set threshold value, the RRC re-establishment procedure or the RRC connection recovery procedure or the RRC connection establishment procedure is triggered via a direct connection link, and/or the Uu RRC connection is released to enter an RRC idle state, to ensure that the remote user equipment quickly recovers the RRC connection.

It should be noted that according to the method for controlling an RRC connection provided in the embodiments of the present application, an executive body may be an apparatus for controlling an RRC connection, or a control module in the apparatus for controlling an RRC connection for executing the method for controlling an RRC connection. The apparatus for controlling an RRC connection provided in the embodiments of the present application is described by taking the apparatus for controlling an RRC connection executing the method for controlling an RRC connection as an example.

As shown in FIG. 5, the embodiment of the present application provides an apparatus 500 for controlling an RRC connection, applied to a relay user equipment, including:

a first processing module 501 configured to perform a first behavior in a case that a first condition is satisfied, the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first condition includes a first interface link connection failure, a first interface link connection recovery failure or an abnormal entry into an RRC idle state;

where the first interface is a connection interface between the relay user equipment and a network-side device;

the second interface is a connection interface between the relay user equipment and the remote user equipment.

Alternatively, the apparatus of an embodiment of the present application further includes:

a second determination module configured to determine the first condition.

Alternatively, in a case that the first behavior includes triggering, through a first interface, a radio resource control (RRC) re-establishment procedure or an RRC connection establishment procedure, the apparatus further includes:

a first receiving module configured to receive an RRC reconfiguration message or an RRC connection recovery message of a remote user equipment transmitted by a network-side device after the RRC re-establishment succeeds or the RRC connection establishment succeeds;

where the RRC reconfiguration message includes an incremental configuration or a full configuration;

the RRC connection recovery message includes an incremental configuration or a full configuration.

Alternatively, the apparatus of an embodiment of the present application further includes:

a first forwarding module configured to forward the RRC reconfiguration message or the RRC connection recovery message to the remote user equipment.

Alternatively, the apparatus of an embodiment of the present application further includes:

a second forwarding module configured to forward the RRC reconfiguration complete message or the RRC connection recovery complete message transmitted by the remote user equipment to the network-side device.

Alternatively, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, further including:

a second processing module configured to assist the remote user equipment to trigger an RRC re-establishment procedure or an RRC connection establishment procedure or an RRC connection recovery procedure after the RRC re-establishment succeeds or the RRC connection establishment succeeds.

The apparatus for controlling an RRC connection according to an embodiment of the present application may realize the various processes achieved by the embodiment of the method of FIG. 2 and achieve the same technical effect, and in order to avoid repetition, the description thereof will not be repeated.

According to an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, so that the remote user equipment can quickly recover the connection when any segment of a PC5 interface connection link and a Uu interface connection link fails, ensuring the reliability of the relay communication.

As shown in FIG. 6, the embodiment of the present application further provides an apparatus 600 for controlling an RRC connection, applied to a remote user equipment, including:

a first determination module 601 configured to determine a second behavior executed by the remote user equipment according to the first behavior of the relay user equipment;

the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first interface is a connection interface between the relay user equipment and a network-side device;

the second interface is a connection interface between the relay user equipment and the remote user equipment.

Alternatively, the apparatus of an embodiment of the present application further includes:

a third determination module configured to determine the first behavior of the relay user equipment.

Alternatively, in a case that the first behavior includes triggering, through a first interface, a radio resource control (RRC) re-establishment procedure or an RRC connection establishment procedure, then the second behavior includes:

acquiring an RRC reconfiguration message or an RRC connection recovery message forwarded by the relay user equipment;

where the RRC reconfiguration message includes an incremental configuration or a full configuration;

the RRC connection recovery message includes an incremental configuration or a full configuration.

Alternatively, the apparatus of an embodiment of the present application further includes:

a first transmitting module configured to transmit an RRC reconfiguration complete message or an RRC connection recovery complete message to the relay user equipment.

Alternatively, in a case that the first behavior includes transmitting, through a second interface to a remote user equipment, abnormal connection indication information or stopping broadcasting a discovery signal, then the second behavior includes at least one of the following:

triggering a relay re-selection procedure according to abnormal connection indication information;

triggering a relay re-selection procedure according to a measurement of the discovery signal; and entering an RRC idle state.

Alternatively, the apparatus of an embodiment of the present application further includes:

a third processing module configured to trigger an RRC connection establishment procedure or an RRC re-establishment procedure or an RRC connection recovery procedure by a reselected relay user equipment after the remote user equipment triggers the relay re-selection procedure.

Alternatively, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, the second behavior further includes:

triggering, through the relay user equipment, an RRC connection establishment procedure or an RRC re-establishment procedure or an RRC connection recovery procedure after the relay user equipment RRC re-establishment succeeds or RRC connection establishment succeeds.

According to the apparatus in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, the remote user equipment executes a corresponding second behavior according to the first behavior of the relay user equipment, so that the remote user equipment can quickly recover the connection when any segment of a PC5 interface connection link and a Uu interface connection link fails, ensuring the reliability of the relay communication.

The apparatus for controlling an RRC connection according to an embodiment of the present application may realize the various processes achieved by the embodiment of the method of FIG. 3 and achieve the same technical effect, and in order to avoid repetition, the description thereof will not be repeated.

As shown in FIG. 7, the embodiment of the present application further provides an apparatus 700 for controlling an RRC connection, applied to a remote user equipment, including:

a fourth processing module 701 configured to perform one of the following operations in a case that the second condition is satisfied:

triggering, through a direct connection link, an RRC re-establishment procedure or an RRC connection recovery procedure or an RRC connection establishment procedure; and entering an RRC idle state;

where the second condition includes: the second interface link fails, or the measurement result of the discovery signal is lower than a pre-set threshold;

the second interface is a connection interface between the relay user equipment and the remote user equipment.

Alternatively, the apparatus of an embodiment of the present application further includes:

a fourth determination module configured to determine whether the second condition is satisfied.

According to the apparatus of an embodiment of the present application, when the remote user equipment determines that a PC5 link connection fails or finds that the signal measurement result is lower than a pre-set threshold value, the RRC re-establishment procedure or the RRC connection recovery procedure or the RRC connection establishment procedure is triggered via a direct connection link, and/or the Uu RRC connection is released to enter an RRC idle state, to ensure that the remote user equipment quickly recovers the RRC connection.

The apparatus for controlling an RRC connection according to an embodiment of the present application may realize the various processes achieved by the embodiment of the method of FIG. 4 and achieve the same technical effect, and in order to avoid repetition, the description thereof will not be repeated.

The apparatus for controlling an RRC connection in the embodiments of the present application can be either a device or a component in a terminal, an integrated circuit, or a chip. The apparatus may be a mobile terminal or a non-mobile terminal. Illustratively, a mobile terminal may include, but is not limited to, the types of remote user equipments 11 listed above, and a non-mobile terminal may be a server, a network attached storage (NAS), a personal computer (PC), a television (TV), a teller machine or a self-service machine, etc., which are not particularly limited according to an embodiment of the present application.

The apparatus for controlling an RRC connection According to an embodiment of the present application may be a device having an operating system. The operating system may be an Android operating system, may be an ios operating system, and may also be other possible operating systems, and the embodiments of the present application are not particularly limited.

Figures 8, 9:
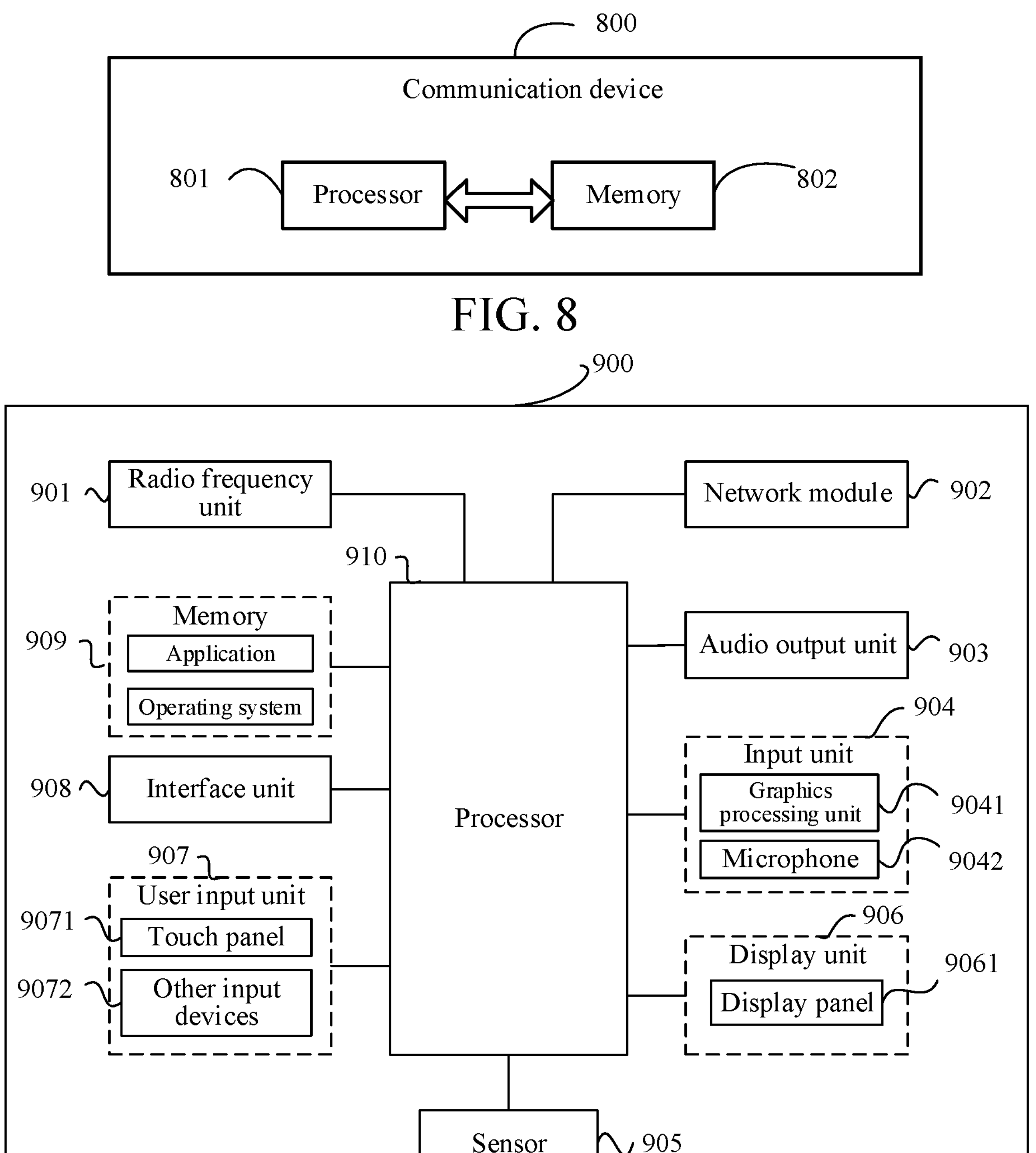
FIG. 8 shows one of block diagrams of a communication device according to an embodiment of the present application.
FIG. 9 shows the second block diagram of a communication device according to an embodiment of the present application.

Alternatively, as shown in FIG. 8, the embodiment of the present application also provides a communication device 800, including a processor 801, a memory 802, and a program or instruction stored in the memory 802 and operable on the processor 801, for example, when the communication device 800 is a relay user equipment, the program or instruction, when being executed by the processor 801, realizes various processes of the embodiment of the method for controlling an RRC connection on the relay user equipment side, and when the communication device 800 is a remote user equipment, the programs or instructions, when executed by the processor 801, implement the various processes of the embodiment of the method for controlling an RRC connection on the remote user equipment side, and can achieve the same technical effect, and in order to avoid repetition, the description thereof will not be repeated.

FIG. 9 is a hardware structure diagram of a communication device implementing an embodiment of the present application, where the communication device is a relay user equipment or a remote user equipment, and the communication device 900 includes but is not limited to: a radio frequency unit 901, a network module 902, an audio output unit 903, an input unit 904, a sensor 905, a display unit 906, a user input unit 907, an interface unit 908, a memory 909, and a processor 910, etc.

As will be appreciated by a person skilled in the art, the communication device 900 may also include a power source (e.g., a battery) for powering the various components, and the power source may be logically coupled to the processor 910 via a power management system for managing charging, discharging, and managing power consumption via the power management system. The communication device structure shown in FIG. 9 does not constitute a limitation to a relay user equipment or a remote user equipment (hereinafter collectively referred to as a terminal), and the terminal may include more or less components than those shown, or a combination of some components, or a different arrangement of components, and will not be described in detail herein.

It should be appreciated that according to an embodiment of the present application, an input unit 904 may include a graphics processing unit (GPU) 9041 and a microphone 9042, the graphics processing unit 9041 processes image data for still pictures or video obtained by an image capture apparatus, such as a camera, in a video capture mode or an image capture mode. The display unit 906 may include a display panel 9061 which may be configured in the form of a liquid crystal display, an organic light emitting diode, etc. The user input unit 907 includes a touch panel 9071 and other input devices 9072. A touch panel 9071, also referred to as a touch screen. The touch panel 9071 may include two parts, namely a touch detection apparatus and a touch controller. Other input devices 9072 may include, but are not limited to, a physical keyboard, function keys (such as volume control keys, switch keys, etc.), a trackball, a mouse, a joystick, etc. which will not be described in detail herein.

According to an embodiment of the present application, a radio frequency unit 901 receives downlink data from a network-side device and then processes same to a processor 910; in addition, uplink data is transmitted to the network-side device. In general, the radio frequency unit 901 includes, but is not limited to, an antenna, at least one amplifier, a transceiver, a coupler, a low noise amplifier, a duplexer, etc.

A memory 909 may be used to store software programs or instructions as well as various data. The memory 909 may primarily include a stored program or instruction area and a stored data area, where the stored program or instruction area may store an operating system, application programs or instructions required for at least one function (such as a sound play function, an image play function, etc.), etc. In addition, the memory 909 may include high-speed random-access memory and may also include non-volatile memory, where the non-volatile memory may be a read-only memory (ROM), a programmable ROM (PROM), an erasable PROM (EPROM), an electrically EPROM (EEPROM), or a flash memory. For example, at least one disk storage device, flash memory device, or other non-volatile solid state storage devices.

The processor 910 may include one or more processing units. Alternatively, the processor 910 may integrate an application processor that primarily handles operating systems, user interfaces, applications or instructions, etc., and a modem processor that primarily handles wireless communications, such as a baseband processor. It will be appreciated that the modem processor described above may not be integrated into the processor 910.

When the communication device is a relay user equipment, the processor 910 is configured to perform a first behavior by the relay user equipment if a first condition is satisfied, the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first condition includes a first interface link connection failure, a first interface link connection recovery failure or an abnormal entry into an RRC idle state;

where the first interface is a connection interface between the relay user equipment and a network-side device;

the second interface is a connection interface between the relay user equipment and the remote user equipment.

Alternatively, in a case that the first behavior includes triggering, through a first interface, a radio resource control (RRC) re-establishment procedure or an RRC connection establishment procedure, then the method further includes:

receiving, by the relay user equipment, an RRC reconfiguration message or an RRC connection recovery message of the remote user equipment transmitted by a network-side device after the RRC re-establishment succeeds or the RRC connection establishment succeeds;

where the RRC reconfiguration message includes an incremental configuration or a full configuration;

the RRC connection recovery message includes an incremental configuration or a full configuration.

Alternatively, the processor 910 is further configured to:

forward the RRC reconfiguration message or the RRC connection recovery message to the remote user equipment.

Alternatively, the processor 910 is further configured to:

forward the RRC reconfiguration complete message or the RRC connection recovery complete message transmitted by the remote user equipment to the network-side device.

Alternatively, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, the processor 910 is further configured to:

assist the remote user equipment to trigger an RRC re-establishment procedure or an RRC connection establishment procedure or an RRC connection recovery procedure after a relay user equipment successful RRC re-establishment or a successful RRC connection establishment.

When the communication device is a remote user equipment, the processor 910 is configured to:

determine a second behavior executed by the remote user equipment according to a first behavior of the relay user equipment;

the first behavior including at least one of the following:

triggering, through a first interface, a radio resource control (RRC) re-establishment procedure or an RRC connection establishment procedure;

transmitting, through a second interface to the remote user equipment, abnormal connection indication information or stopping broadcasting a discovery signal;

where the first interface is a connection interface between the relay user equipment and a network-side device;

the second interface is a connection interface between the relay user equipment and the remote user equipment.

Alternatively, in a case that the first behavior includes triggering, through a first interface, a radio resource control (RRC) re-establishment procedure or an RRC connection establishment procedure, then the second behavior includes:

acquiring an RRC reconfiguration message or an RRC connection recovery message forwarded by the relay user equipment;

where the RRC reconfiguration message includes an incremental configuration or a full configuration;

the RRC connection recovery message includes an incremental configuration or a full configuration.

Alternatively, the processor 910 is further configured to:

transmit an RRC reconfiguration complete message or an RRC connection recovery complete message to the relay user equipment.

Alternatively, in a case that the first behavior includes transmitting, through a second interface to a remote user equipment, abnormal connection indication information or stopping broadcasting a discovery signal, then the second behavior includes at least one of the following:

triggering a relay re-selection procedure according to abnormal connection indication information;

triggering a relay re-selection procedure according to a measurement of the discovery signal; and entering an RRC idle state.

Alternatively, the processor 910 is further configured to:

trigger, by a reselected relay user equipment, an RRC connection establishment procedure or an RRC re-establishment procedure or an RRC connection recovery procedure after the remote user equipment triggers the relay re-selection procedure.

Alternatively, in a case that the first behavior includes triggering, through a first interface, a radio resource control (RRC) re-establishment procedure or an RRC connection establishment procedure, and transmitting, through a second interface to a remote user equipment, abnormal connection indication information or stopping broadcasting a discovery signal, the second behavior further includes:

triggering, through the relay user equipment, an RRC connection establishment procedure or an RRC re-establishment procedure or an RRC connection recovery procedure after the relay user equipment RRC re-establishment succeeds or RRC connection establishment succeeds.

When the communication device is a remote user equipment, the processor 910 is further configured to:

perform, by the remote user equipment, one of the following operations in a case that the second condition is satisfied:

triggering, through a direct connection link, an RRC re-establishment procedure or an RRC connection recovery procedure or an RRC connection establishment procedure; and entering an RRC idle state;

where the second condition includes: the second interface link fails, or the measurement result of the discovery signal is lower than a pre-set threshold;

the second interface is a connection interface between the relay user equipment and the remote user equipment.

According to the communication device in an embodiment of the present application, when the first interface link connection fails, the first interface link connection recovery fails or an abnormal entry into an RRC idle state, the relay user equipment triggers a radio resource control (RRC) re-establishment procedure or an RRC connection establishment procedure via a first interface, and/or transmits abnormal connection indication information or stopping broadcasting a discovery signal to the remote user equipment via a second interface, the remote user equipment executes a corresponding second behavior according to the first behavior of the relay user equipment, so that the remote user equipment can quickly recover the connection when any segment of a PC5 interface connection link and a Uu interface connection link fails, ensuring the reliability of the relay communication.

The embodiments of the present application also provide a readable storage medium, where the readable storage medium can be either non-volatile or volatile, and the readable storage medium has a program or instructions stored thereon, and when the program or instructions are executed by a processor, various processes of the above-mentioned embodiments of the method for controlling an RRC connection can be realized, and the same technical effect can be achieved; therefore, in order to avoid repetition, the description thereof will not be repeated.

The processor is a processor in the terminal described in the above-mentioned embodiment. The readable storage medium includes a computer readable storage medium such as a read-only memory (ROM), a random-access memory (Random Access Memory, RAM), a magnetic disk or an optical disk, etc.

The embodiments of the present application further provide a chip including a processor and a communication interface, the communication interface being coupled to the processor, and the processor being used for running a program or instruction to implement various processes of the above-mentioned embodiments of the method for controlling an RRC connection and may achieve the same technical effect, and in order to avoid repetition, the description thereof will not be repeated.

It should be understood that chips referred to according to an embodiment of the present application may also be referred to as System-on-Chip, System-on-a-Chip, System-on-Chip, and SOC chip, etc.

Embodiments of the present application further provide a computer program product, where the computer program product is stored in a non-transitory readable storage medium, and the computer program product is executed by at least one processor to implement the processes of embodiments of the above-mentioned method for controlling an RRC connection and achieve the same technical effect, and in order to avoid repetition, the description thereof will not be repeated.

It should be noted that the terms "include", "comprise", or any other variation thereof, are intended to cover a non-exclusive inclusion, such that a process, method, article, or apparatus that includes a list of elements does not include only those elements but may include other elements not expressly listed or inherent to such process, method, article, or apparatus. Without further limitation, an element identified by the phrase "including an . . . " does not exclude the presence of additional same elements in a process, method, article, or apparatus that includes the element. Further, it should be noted that the scope of the methods and apparatuses according to an embodiment of the present application is not limited to performing the functions in the order shown or discussed, and may include performing the functions in a substantially simultaneous manner or in a reverse order according to the functions involved, e.g., the methods described may be performed in an order different from that described, and various steps may also be added, omitted, or combined. In addition, features described with reference to certain examples may be combined in other examples.

From the description of the embodiments given above, it will be clear to a person skilled in the art that the method of the embodiments described above may be implemented by means of software plus a necessary general hardware platform, but of course also by means of hardware, but in many cases the former is a better embodiment. Based on such understanding, the technical solutions of the present application or portions thereof that contribute to the prior art may be embodied in the form of a software product, where the computer software product is stored in a storage medium (such as a ROM/RAM, a magnetic disk, and an optical disk), and includes several instructions for enabling a terminal (which may be a mobile phone, a computer, a server, or a network device, etc.) to execute the method described according to an embodiment of the present application.

The embodiments of the present application have been described above with reference to the accompanying drawings, but the present application is not limited to the above-mentioned specific embodiments, which are merely illustrative and not restrictive, and a person skilled in the art would have been able to make many forms of the present application under the inspiration of the present application without departing from the spirit and scope of the present application as claimed.

What is claimed is:

1. A method for controlling a radio resource control (RRC) connection, comprising:

performing, by a relay user equipment, a first behavior in a case that a first condition is satisfied, the first behavior comprising at least one of the following:

triggering, through a first interface, an RRC re-establishment procedure or an RRC connection establishment procedure; or transmitting, through a second interface to a remote user equipment, abnormal connection indication information or stopping broadcasting a discovery signal;

wherein the first condition comprises first interface link connection recovery failure;

wherein the first interface is a connection interface between the relay user equipment and a network-side device; and the second interface is a connection interface between the relay user equipment and the remote user equipment.

2. The method according to claim 1, wherein in a case that the first behavior comprises triggering, through the first interface, the radio resource control (RRC) re-establishment procedure or the RRC connection establishment procedure, the method further comprises:

receiving, by the relay user equipment, an RRC reconfiguration message or an RRC connection recovery message of the remote user equipment transmitted by the network-side device after the RRC re-establishment succeeds or the RRC connection establishment succeeds;

wherein the RRC reconfiguration message comprises an incremental configuration or a full configuration; and the RRC connection recovery message comprises an incremental configuration or a full configuration.

3. The method according to claim 2, further comprising:

forwarding, by the relay user equipment, the RRC reconfiguration message or the RRC connection recovery message to the remote user equipment;

or the method further comprises:

forwarding, by the relay user equipment, an RRC reconfiguration complete message or an RRC connection recovery complete message transmitted by the remote user equipment to the network-side device.

4. The method according to claim 1, wherein in a case that the first behavior comprises triggering, through the first interface, the radio resource control (RRC) re-establishment procedure or the RRC connection establishment procedure, and transmitting, through the second interface to the remote user equipment, the abnormal connection indication information or stopping broadcasting the discovery signal, the method further comprises:

assisting, by the relay user equipment, the remote user equipment to trigger the RRC re-establishment procedure or the RRC connection establishment procedure or an RRC connection recovery procedure after a successful RRC re-establishment or a successful RRC connection establishment.

5. A method for controlling a radio resource control (RRC) connection, comprising:

determining a second behavior executed by a remote user equipment in a case that the remote user equipment receives abnormal connection indication information from a relay user equipment through a second interface;

wherein the second behavior comprises triggering a relay re-selection procedure according to the abnormal connection indication information, and the abnormal connection indication information is configured to indicate a first interface link connection recovery failure;

wherein the first interface is a connection interface between the relay user equipment and a network-side device; and the second interface is a connection interface between the relay user equipment and the remote user equipment.

6. The method according to claim 5, wherein the second behavior further comprises at least one of the following:

triggering a relay re-selection procedure according to a measurement of a discovery signal; or entering an RRC idle state.

7. The method according to claim 5, further comprising:

triggering, through a reselected relay user equipment, the RRC connection establishment procedure or the RRC re-establishment procedure or an RRC connection recovery procedure after the remote user equipment triggers the relay re-selection procedure.

8. A method for controlling an RRC connection, comprising:

performing, by a remote user equipment, one of the following operations in a case that a second condition is satisfied:

triggering, through a direct connection link, an RRC re-establishment procedure or an RRC connection recovery procedure or an RRC connection establishment procedure; and entering an RRC idle state;

wherein the second condition comprises: a second interface link fails, or a measurement result of a discovery signal is lower than a pre-set threshold; and the second interface is a connection interface between a relay user equipment and the remote user equipment.

9. A communication device, comprising a processor, a memory and a program or instructions stored on the memory and executable on the processor, wherein the program or instructions when executed by the processor implement the steps of the method for controlling the RRC connection according to claim 1.

10. The communication device according to claim 9, wherein in a case that the first behavior comprises triggering, through the first interface, the radio resource control (RRC) re-establishment procedure or the RRC connection establishment procedure, the program or instructions when executed by the processor implement:

receiving an RRC reconfiguration message or an RRC connection recovery message of the remote user equipment transmitted by the network-side device after the RRC re-establishment succeeds or the RRC connection establishment succeeds;

wherein the RRC reconfiguration message comprises an incremental configuration or a full configuration; and the RRC connection recovery message comprises an incremental configuration or a full configuration.

11. The communication device according to claim 10, wherein the program or instructions when executed by the processor implement:

forwarding the RRC reconfiguration message or the RRC connection recovery message to the remote user equipment;

or the program or instructions when executed by the processor implement:

forwarding an RRC reconfiguration complete message or an RRC connection recovery complete message transmitted by the remote user equipment to the network-side device.

12. The communication device according to claim 9, wherein in a case that the first behavior comprises triggering, through the first interface, the radio resource control (RRC) re-establishment procedure or the RRC connection establishment procedure, and transmitting, through the second interface to the remote user equipment, the abnormal connection indication information or stopping broadcasting the discovery signal, the program or instructions when executed by the processor implement:

assisting the remote user equipment to trigger the RRC re-establishment procedure or the RRC connection establishment procedure or an RRC connection recovery procedure after a successful RRC re-establishment or a successful RRC connection establishment.

13. A communication device, comprising a processor, a memory and a program or instructions stored on the memory and executable on the processor, wherein the program or instructions when executed by the processor implement the steps of the method for controlling the RRC connection according to claim 5.

14. The communication device according to claim 13, wherein in a case that the first behavior comprises transmitting, through the second interface to the remote user equipment, the abnormal connection indication information or stopping broadcasting the discovery signal, the second behavior further comprises at least one of the following:

triggering a relay re-selection procedure according to a measurement of the discovery signal; or entering an RRC idle state.

15. The communication device according to claim 13, wherein the program or instructions when executed by the processor implement:

triggering, through a reselected relay user equipment, the RRC connection establishment procedure or the RRC re-establishment procedure or an RRC connection recovery procedure after the remote user equipment triggers the relay re-selection procedure.

16. A communication device, comprising a processor, a memory and a program or instructions stored on the memory and executable on the processor, wherein the program or instructions when executed by the processor implement the steps of the method for controlling the RRC connection according to claim 8.

* * * * *